United States Patent
Jeon

(10) Patent No.: US 8,437,429 B2
(45) Date of Patent: May 7, 2013

(54) DATA PROCESSING APPARATUS AND DATA PROCESSING SYSTEM INCLUDING THE SAME

(75) Inventor: Phil Jae Jeon, Hwasung (KR)

(73) Assignee: Samsung Electronics Co., Ltd. (KR)

( * ) Notice: Subject to any disclaimer, the term of this patent is extended or adjusted under 35 U.S.C. 154(b) by 899 days.

(21) Appl. No.: 12/584,517

(22) Filed: Sep. 8, 2009

(65) Prior Publication Data

US 2010/0061486 A1 Mar. 11, 2010

(30) Foreign Application Priority Data

Sep. 10, 2008 (KR) .......................... 10 2008 0089192

(51) Int. Cl.
*H04L 25/06* (2006.01)
*H04L 25/10* (2006.01)

(52) U.S. Cl.
USPC .......................................... 375/319; 375/316

(58) Field of Classification Search .................. 375/319, 375/376, 317, 316, 372, 371, 354; 348/500
See application file for complete search history.

(56) References Cited

U.S. PATENT DOCUMENTS

| | | | |
|---|---|---|---|
| 2005/0286643 A1* | 12/2005 | Ozawa et al. | ................. 375/242 |
| 2007/0268212 A1 | 11/2007 | Han et al. | |
| 2008/0012746 A1 | 1/2008 | Zheng | |
| 2008/0106316 A1 | 5/2008 | Ha | |

FOREIGN PATENT DOCUMENTS

| | | |
|---|---|---|
| KR | 1020070111100 A | 11/2007 |
| KR | 1020080041458 A | 5/2008 |

* cited by examiner

*Primary Examiner* — David C. Payne
*Assistant Examiner* — Brian J Stevens
(74) *Attorney, Agent, or Firm* — Onello & Mello, LLP

(57) ABSTRACT

In a data processing apparatus and a data processing system including the same, the data processing apparatus includes a clock signal generation unit configured to receive a data signal comprising a preamble signal, information about DC balance codes for DC balance, an embedded clock signal between the DC balance codes, and information about serialized valid data, to generate a synchronous clock signal that is synchronized with the serialized valid data based on the data signal, and to generate at least one sample clock signal based on the synchronous clock signal; and a data processor configured to deserialize the serialized valid data based on the at least one sample clock signal, to decode deserialized data based on the DC balance codes, and to output decoded data.

12 Claims, 8 Drawing Sheets

| CD0 | CD0 | Data | Illustration |
|---|---|---|---|
| 0 | 1 | 12'h000 ==> 12'h000 | 12'h000 12'h000 12'h000 12'h000 Parallel to Serial |
| 1 | 0 | 12'h000 ==> 12'hFFF | 12'h000 01 12'hFFF 10 12'h000 01 12'bFFF 10 |

FIG. 4

DATA PROCESSING APPARATUS AND DATA PROCESSING SYSTEM INCLUDING THE SAME

BACKGROUND

Embodiments of the present invention relate to data processing technology, and more particularly, to a data processing apparatus and system for restoring serialized data based on a data signal embedding a clock signal.

A data processing apparatus (e.g., a deserializer) that can be used in a display apparatus is based on a clock signal and independent transmission/reception of data. Skew between the clock signal and the data is important to the performance and reliability of the deserializer. For instance, the data received by the deserializer is distorted unless the start timing of the clock signal coincides exactly with the reception timing of the data.

SUMMARY

Some embodiments of the present invention provide a data processing apparatus and system for solving a skew problem that may occur in a slave by embedding a clock signal into a data signal.

According to some embodiments of the present invention, there is provided a data processing apparatus including a clock signal generation unit configured to receive a data signal including a preamble signal, information about DC balance codes for DC balance, an embedded clock signal between the DC balance codes, and information about serialized valid data, to generate a synchronous clock signal that is synchronized with the serialized valid data based on the data signal, and to generate at least one sample clock signal based on the synchronous clock signal; and a data processor configured to deserialize the serialized valid data based on the at least one sample clock signal, to decode deserialized data based on the DC balance codes, and to output decoded data.

The preamble signal may include a training signal and the clock signal generation unit is locked in response to the training signal.

The preamble signal may include at least one type of information among information about a horizontal sync signal, information about a vertical sync signal, and information about a data enable signal and the data processor restores the horizontal sync signal, the vertical sync signal, and the data enable signal based on the preamble signal.

The clock signal generation unit may include a clock signal restoring block configured to receive the data signal and to generate the synchronous clock signal that is synchronized with the serialized valid data based on the embedded clock signal in the data signal; and a clock generator configured to generate the at least one sample clock signal in response to the synchronous clock signal.

The data processor may perform DC balancing by bypassing or inverting the serialized valid data based on levels of the respective DC balance codes.

The data processor may include a deserializer configured to deserialize the serialized valid data based on the at least one sample clock signal; and a decoder configured to decode the deserialized data output from the deserializer based on the DC balance codes and to output the decoded data.

According to other embodiments of the present invention, there is provided a data processing apparatus including an encoder configured to receive parallel data, at least one synchronous signal, and a clock signal and to DC-balance the parallel data; and a serializer configured to serialize DC-balanced data output from the encoder and to generate a data signal including a preamble signal, DC balance codes including DC balance information, and information about serialized data. The serializer may embed the clock signal between the DC balance codes.

The serializer may insert at least one type of information among a training signal, information about a horizontal sync signal, information about a vertical sync signal, and information about a data enable signal into the preamble signal.

According to further embodiments of the present invention, there is provided a data processing system including a master configured to receive parallel data, at least one synchronous signal, and a clock signal and to generate a data signal including a preamble signal, information about DC balance codes for DC balance, an embedded clock signal between the DC balance codes, and information about serialized data; and a slave configured to receive the data signal, to generate a synchronous clock signal that is synchronized with the serialized data included in the data signal, and to deserialize the serialized data based on the synchronous clock signal. The master may DC-balance the parallel data and output DC-balanced data as the serialized data.

The master may include an encoder configured to receive the parallel data, the at least one synchronous signal, and the clock signal and to DC-balance the parallel data; and a serializer configured to serialize DC-balanced data output from the encoder and to generate the data signal comprising the preamble signal, the DC balance codes comprising DC balance information, and information about the serialized data. The serializer may embed the clock signal between the DC balance codes.

The slave may include a clock signal generation unit configured to receive the data signal, to generate the synchronous clock signal that is synchronized with the serialized valid data based on the data signal, and to generate at least one sample clock signal based on the synchronous clock signal; and a data processor configured to deserialize the serialized valid data based on the at least one sample clock signal, to decode deserialized data based on the DC balance codes, and to output decoded data.

BRIEF DESCRIPTION OF THE DRAWINGS

The above and other features and advantages of the embodiments of the present invention will become more apparent by describing in detail exemplary embodiments thereof with reference to the attached drawings in which:

FIG. 4 illustrates a protocol for DC balance codes included in the data signal illustrated in FIG. 1;

DETAILED DESCRIPTION OF THE EMBODIMENTS

Figure 1:
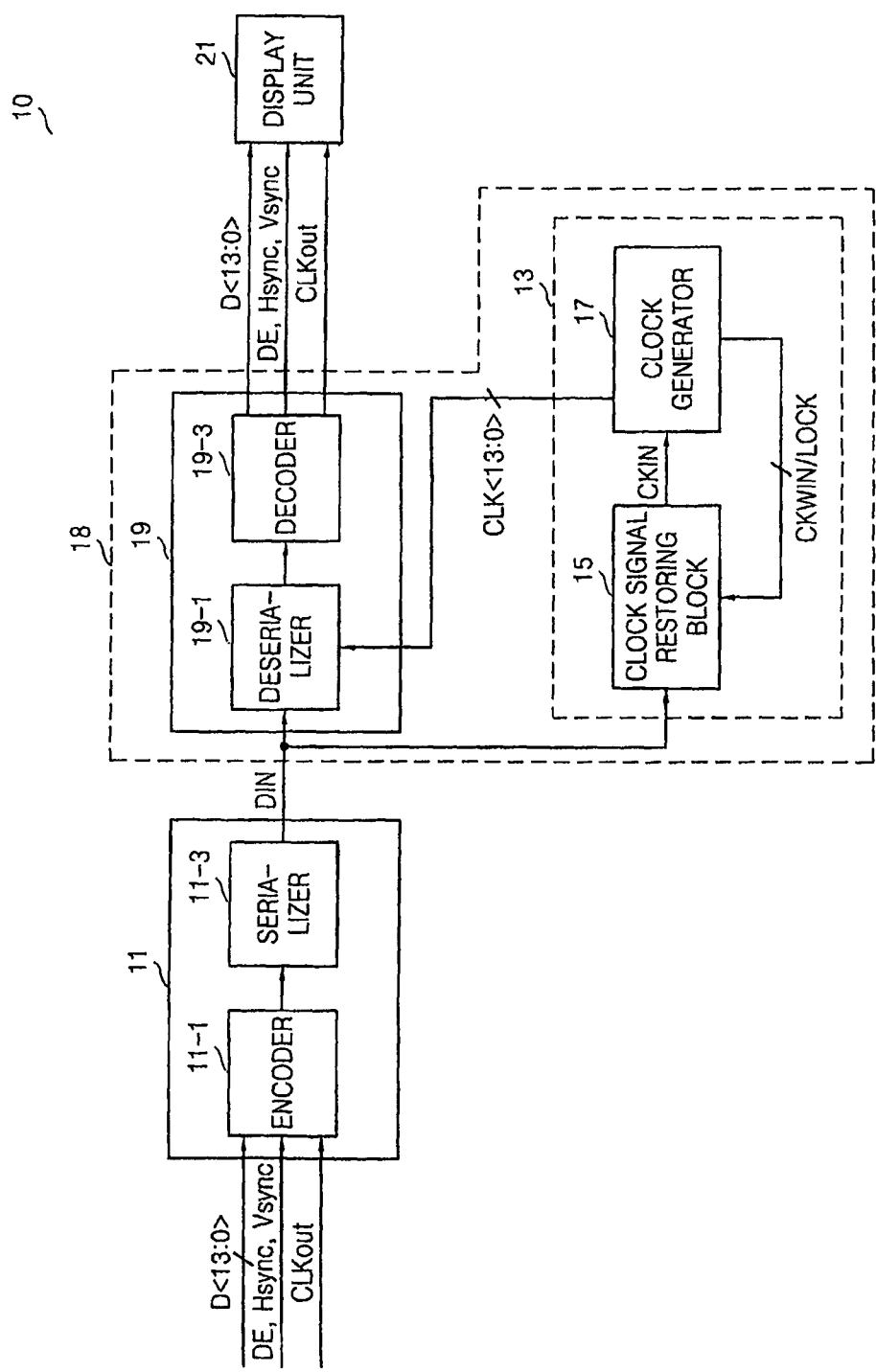
FIG. 1 is a block diagram of a data processing system according to some embodiments of the present invention.

This application claims priority under 35 U.S.C. § 119(a) to Korean Patent Application No. 10-2008-0089192 filed on Sep. 10, 2008, in the Korean Intellectual Property Office, the disclosure of which is incorporated herein by reference.

Embodiments of the present invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of a data processing system 10 according to some embodiments of the present invention. The data processing system 10, which may be a display apparatus such as a liquid crystal display (LCD) apparatus or a plasma display panel (PDP) apparatus, may include a master (or a transmitting terminal) 11, a slave (or a receiving terminal) 18, and a display unit 21.

The master 11 may receive parallel data, e.g., 14-bit data D<13:0>; at least one synchronous signal, or control signal, DE, Hsync, and Vsync; and a clock signal CLKout and serialize valid data D<11:0> in the parallel data D<13:0> based on the clock signal CLKout. The master 11 may generate a data signal according to a protocol illustrated in FIG. 2 in order to transmit the serialized data.

Figure 2:
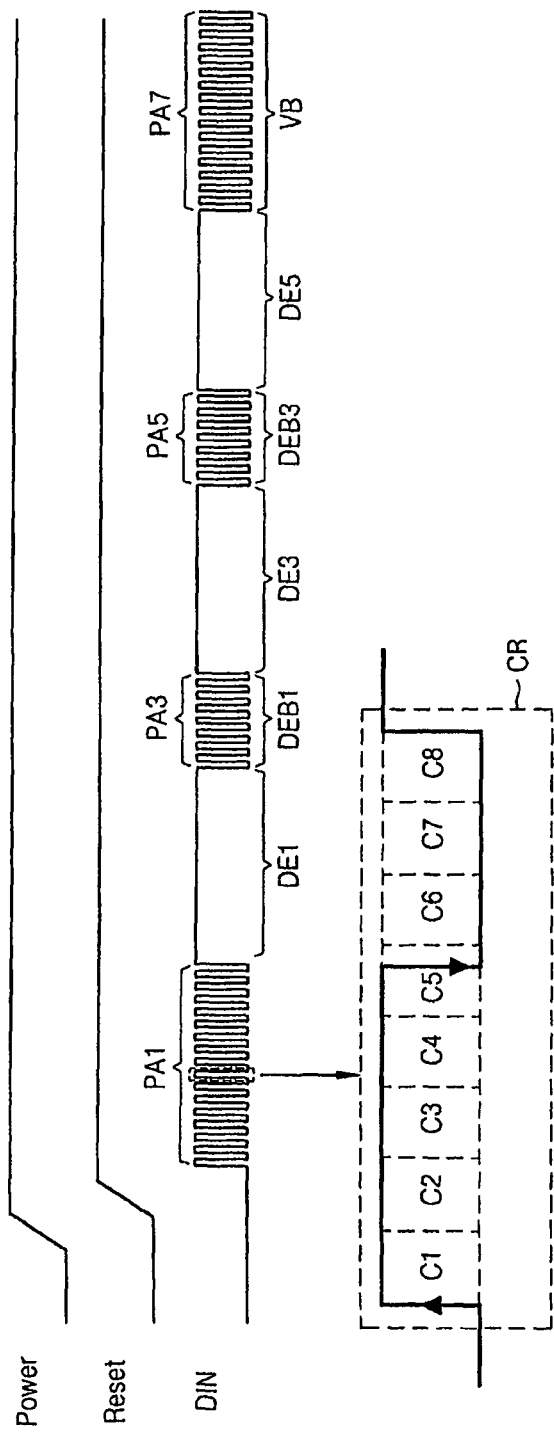
FIG. 2 is a diagram for explaining a protocol for a data signal input to the data processing system illustrated in FIG. 1.
Figure 3:
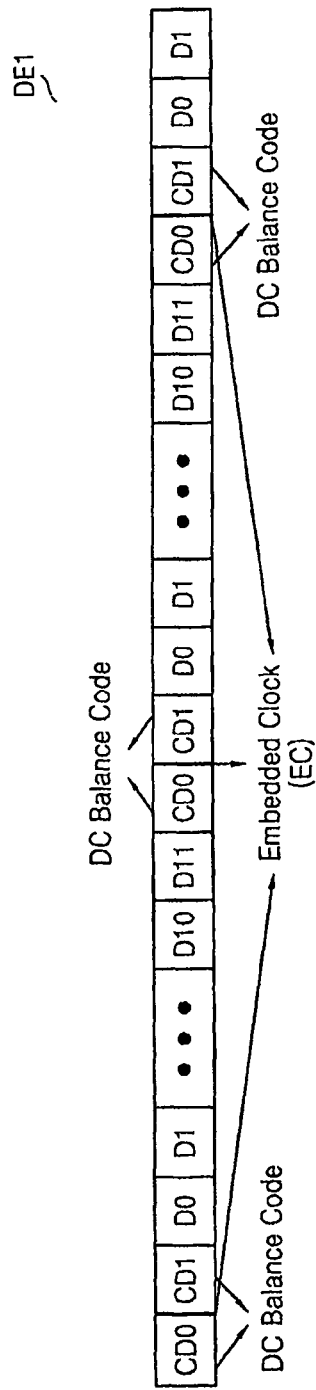
FIG. 3 is a diagram for explaining a protocol for a data signal input during a data enable period to the data processing system illustrated in FIG. 1.

FIG. 2 is a diagram for explaining a protocol for a data signal input to the data processing system 10 illustrated in FIG. 1. FIG. 3 is a diagram for explaining a protocol for a data signal input during a data enable period to the data processing system 10 illustrated in FIG. 1. Referring to FIGS. 1 through 3, after the data processing system 10 is turned on and reset, the master 11 may generate a data signal DIN including preamble signals PA1, PA3, PA5, and PA7 and data enable sections DE1, DE3, and DE5.

The preamble signals PA1, PA3, PA5, and PA7 may include a training signal, e.g., PA1, in the current embodiments, and a clock signal generation unit 13, which will be described below, may be locked in response to the training signal PA1. In addition, the preamble signals PA1, PA3, PA5, and PA7 may include at least one type of information among information about a blank period in a horizontal sync signal Hsync, information about a blank period VB in a vertical sync signal Vsync, and information about a blank period DEB1 in a data enable signal DE.

In addition, the preamble signals PA1, PA3, PA5, and PA7 may include at least one type of information among information about the horizontal sync signal Hsync, information about the vertical sync signal Vsync, and information about the data enable signal DE. For instance, the master 11 may embed at least one type of information among the information about the horizontal sync signal Hsync, the information about the vertical sync signal Vsync, and the information about the data enable signal DE into at least one clock cycle CR of a clock signal included in the preamble signal PA1. When the master 11 embeds all of the information about the horizontal sync signal Hsync, the information about the vertical sync signal Vsync, and the information about the data enable signal DE into the preamble signal PA1, one clock cycle CR may be divided into first through eighth segments C1 through C8. At this time, the master 11 may embed state information (e.g., high or low state) of each of the synchronous signals Hsync, Vsync, and DE by setting one edge (e.g., a falling edge) among the rising and falling edges of the preamble signal PA1 to belong to any one of the first through eighth segments C1 through C8.

In other words, since the number of cases expressing the logic levels of the three synchronous signals Hsync, Vsync, and DE is 8, the master 11 may partition one clock cycle CR into the first through eighth segments C1 through C8 and set the falling edge of the preamble signal PA1 to belong to any one of the first through eighth segments C1 through C8, thereby embedding the state information of each of the synchronous signals Hsync, Vsync, and DE.

In addition, the master 11 may insert information about DC balance codes CD0 and CD1 for DC balance, an embedded clock signal EC between the DC balance codes CD0 and CD1, and information about the serialized valid data D0 through D11 into valid data sections, i.e., the data enable sections DE1, DE3 and DE5 in the data signal DIN. The DC balance indicates the balance between a first logic level (e.g., a high level) and a second logic level (e.g., a low level) among data bits when digital data is transmitted.

The master 11 may secure the DC balance of the serialized valid data D0 through D11 by controlling the level of each of the DC balance codes CD0 and CD1. For instance, when first valid data (for example, of 12 bits) and second valid data (for example, of 12 bits) are serialized and the second valid data following the first valid data has the same first logic level as the first valid data, the master 11 may invert the second valid data. At this time, the master 11 may introduce information concerning the inversion of the second valid data into the DC balance codes CD0 and CD1.

The master 11 may insert "01" as the DC balance codes following valid data in order to bypass the logic level of each bit in the valid data and may insert "10" as the DC balance codes CD0 and CD1 following valid data in order to invert the logic level of each bit in the valid data.

For instance, when serializing first through fourth valid data 12'h000, 12'h000, 12'h000, and 12'h000 having a low level, the master 11 may invert the second and fourth valid data and impose information about the inversion on the DC balance codes CD0 and CD1 following each of the second and fourth valid data, like 12'h0000112'hFFF1012'h0000112'hFFF10, as shown in FIG. 4. Here, "12'h000" may indicate that all bits in N (which is a natural number, e.g., 12)-bit data have a second logic level (e.g., a low level) and "12'hFFF" may indicate that all bits in N (which is a natural number, e.g., 12)-bit data have a first logic level (e.g., a high level).

When transmitting at least one of the synchronous signals Hsync, Vsync, and DE using the data signal DIN, the master 11 may set all of the bits D0 through D11 of second valid data following in serial the bits D0 through D11 of first valid data to have a second logic level (e.g., a low level of "0"). For instance, when informing the slave 18 of the start of a synchronous signal, the master 11 may set all of the bits D0 through D11 of second valid data following in series the bits D0 through D11 of first valid data to have the second logic level (i.e., the low level of "0") and replace a signal following the second valid data with at least one of the synchronous signals Hsync, Vsync, and DE.

When the master 11 has already transmitted at least one of the synchronous signals Hsync, Vsync, and DE using the data signal DIN, the master 11 may set all of the bits D0 through D11 of second valid data following in series the bits D0 through D11 of first valid data to have a first logic level (e.g., a high level of "1"). At this time, when all of the bits D0 through D11 of the second valid data following the first valid data have the first logic level (i.e., the high level of "1"), the slave 18 may recognize that at least one of the synchronous signals Hsync, Vsync, and DE has already been transmitted from the master 11 using the data signal DIN.

The master 11 may include an encoder 11-1 and a serializer 11-3. The encoder 11-1 may receive the parallel data D<13:0>, at least one of the synchronous signals Hsync, Vsync, and DE, and the clock signal CLKout and DC-balance the valid data D<11:0> in the parallel data D<13:0>. Since the DC balancing has been described above, a detailed description thereof will be omitted.

The serializer 11-3 may serialize data (e.g., D0 through D11 in FIG. 3) DC-balanced by the encoder 11-1 and generate the data signal DIN including the preamble signals PA1, PA3, PA5, and PA7, the DC balance codes CD0 and CD1 containing DC balance information, and information about the serialized data D0 through D11. At this time, the serializer 11-3 may embed the clock signal EC (FIG. 3) between the DC balance codes CD0 and CD1.

The slave 18 may receive the data signal DIN from the master 11 and deserialize the serialized valid data D0 through D11 based on the embedded clock signal EC in the data signal DIN. The slave may include the clock signal generation unit 13 and a data processor 19. The clock signal generation unit 13 may receive the data signal DIN and generate one or more sample clock signals CLK<13:0> that are synchronized with the serialized valid data D0 through D11. At this time, the data signal DIN may include the preamble signals PA1, PA3, PA5, and PA7, the DC balance codes CD0 and CD1 for DC balance, the embedded clock signal EC between the DC balance codes CD0 and CD1, and the information about the serialized valid data D0 through D11.

When the preamble signals PA1, PA3, PA5, and PA7 include a training signal, the clock signal generation unit 13 can be locked in response to the training signal. After being locked in response to the training signal, the clock signal generation unit 13 may generate the one or more sample clock signals CLK<13:0> synchronized with the valid data D0 through D11.

The clock signal generation unit 13 may include a clock signal restoring block 15 and a clock generator 17. The clock signal restoring block 15 may receive the data signal DIN and generate a synchronous clock signal CKIN synchronized with the serialized valid data D0 through D11 based on the embedded clock signal EC in the data signal DIN.

Figure 5:
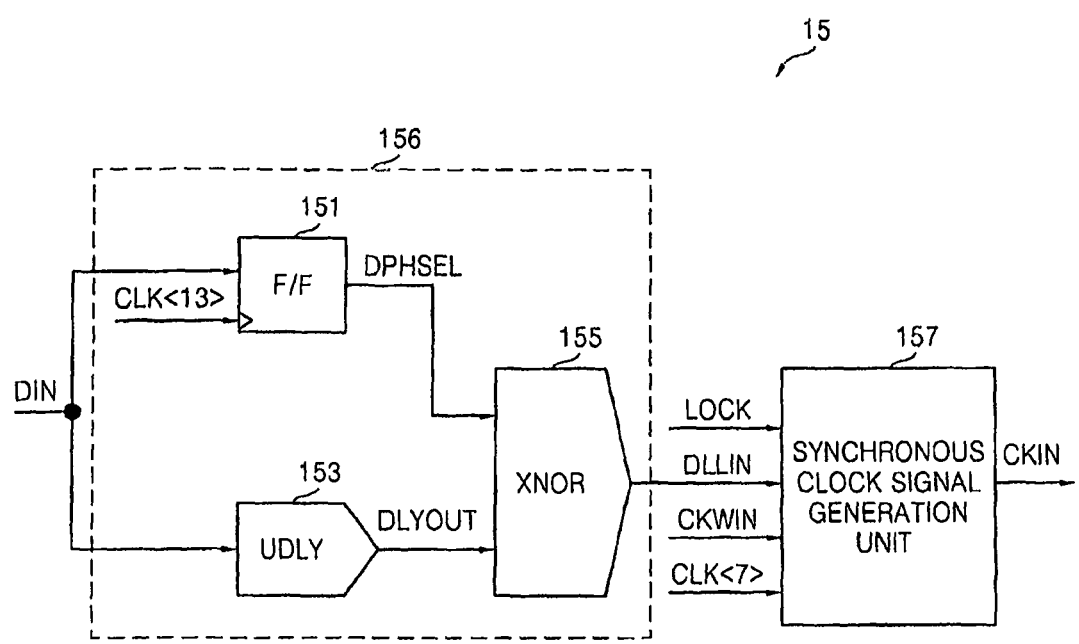
FIG. 5 is a block diagram of a clock signal restoring block illustrated in FIG. 1.

FIG. 5 is a block diagram of the clock signal restoring block 15 illustrated in FIG. 1. The clock signal restoring block 15 may include a delay signal generation unit 156 and a synchronous clock signal generation unit 157.

The delay signal generation unit 156 may delay the data signal DIN by a predetermined period of time after the clock generator 17 is locked in response to a preamble signal (e.g., PA1 in FIG. 2) including a training signal and may output a delayed data signal DLLIN. At this time, the delay signal generation unit 156 may control the DC balance codes CD0 and CD1 to transition from a first logic level (e.g., a high level of "1") to a second logic level (e.g., a low level of "0") in the delayed data signal DLLIN.

The delay signal generation unit 156 may include a flip-flop 151, a delay unit 153, and a logic circuit 155. The flip-flop 151 may latch the data signal DIN in response to the sample clock signal CLK<13> for detecting the DC balance codes CD0 and CD1 among the sample clock signals CLK<13:0> and output a latched signal DPHSEL.

The delay unit 153 may delay the data signal DIN by the predetermined period of time and output a delay result DLYOUT. The logic circuit 155 may receive the latched signal DPHSEL from the flip-flop 151 and the delay result DLYOUT from the delay unit 153, perform an XNOR operation on the received signals DPHSEL and DLYOUT, and output a result of the XNOR operation as the delayed data signal DLLIN.

The synchronous clock signal generation unit 157 may detect the embedded clock signal EC in the delayed data signal DLLIN in response to the delayed data signal DLLIN and generate the synchronous clock signal CKIN based on a result of the detection. In detail, the synchronous clock signal generation unit 157 can be configured to bypass the data signal DIN before the clock generator 17 is locked and to generate the synchronous clock signal CKIN after the clock generator 17 has been locked.

Figure 6:
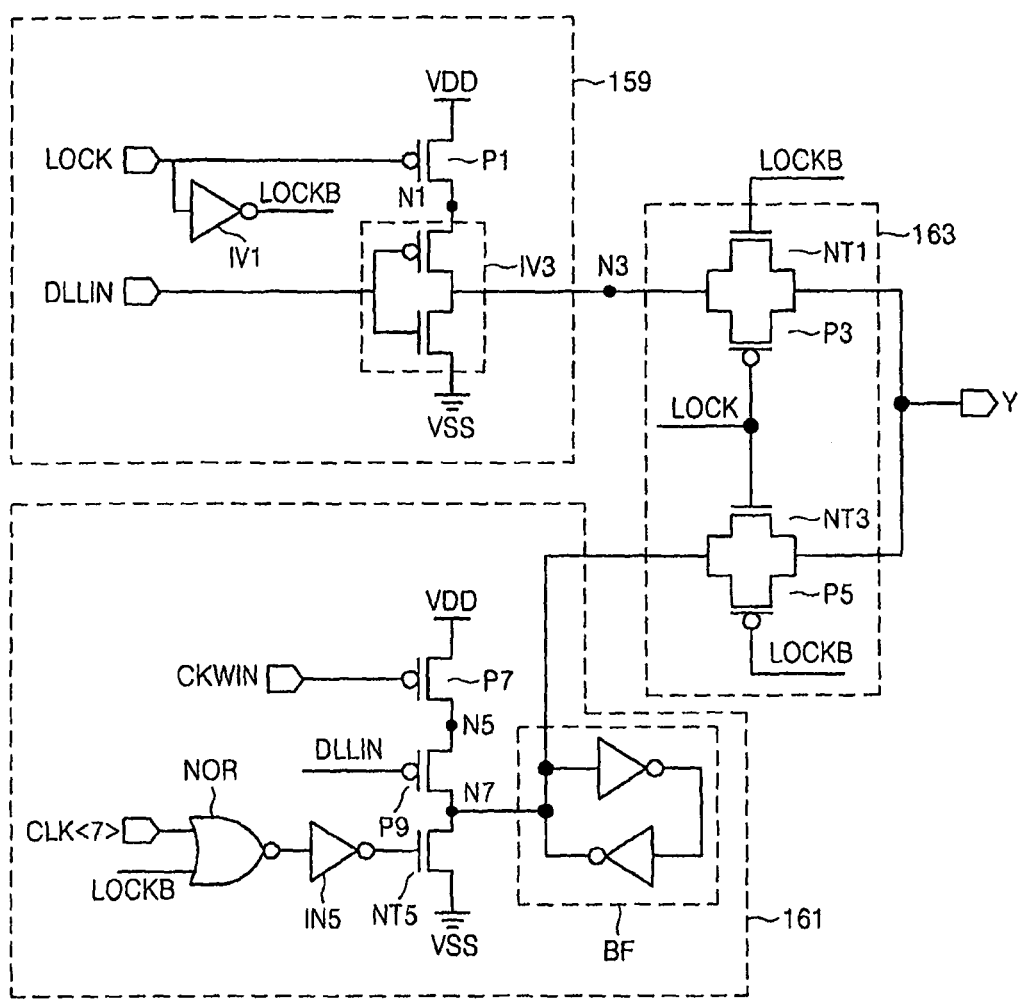
FIG. 6 is a block diagram of a synchronous clock signal generation unit illustrated in FIG. 5.

FIG. 6 is a block diagram of the synchronous clock signal generation unit 157 illustrated in FIG. 5. Referring to FIGS. 1 through 6, the synchronous clock signal generation unit 157 may include a bypass output unit 159, a synchronous clock signal generator 161, and a selector 163.

The bypass output unit 159 may invert the delayed data signal DLLIN when the clock generator 17 is locked. The bypass output unit 159 may include a first switch P1, a first inverter IV1, and a second inverter IV3. The first switch P1 is connected between a first power supply VDD and a first node N1. The first switch P1 may be gated in response to a lock signal LOCK to electrically connect the first power supply VDD with the first node N1. The first inverter IV1 may invert the lock signal LOCK and output an inverted signal LOCKB. The second inverter IV3 may invert the delayed data signal DLLIN to a voltage of the first node N1 or a voltage of a second power supply VSS.

The synchronous clock signal generator 161 may detect the embedded clock signal EC in the delayed data signal DLLIN in response to the delayed data signal DLLIN and generate the synchronous clock signal CKIN based on a result of the detection. The synchronous clock signal generator 161 may include a second switch P7, a third switch P9, a logic gate NOR, a third inverter IN5, a fourth switch NT5, and a buffer BF.

The second switch P7 is connected between the first power supply VDD and a second node N5. The second switch P7 may be gated in response to a detection signal CKWIN for detecting the embedded clock signal EC in the delayed data signal DLLIN to electrically connect the first power supply VDD with the second node N5.

The third switch P9 is connected between the second node N5 and a third node N7. The third switch P9 may be gated in response to the delayed data signal DLLIN to electrically connect the second node N5 with the third node N7.

The logic gate NOR may receive one signal (e.g., CLK<7>) among the sample clock signals CLK<13:0> generated by the clock generator 17 and the inverted lock signal LOCKB and perform a NOR operation on the clock signal CLK<7> and the inverted lock signal LOCKB. The third inverter IN5 may receive and invert an output signal of the logic gate NOR and output an inverted signal.

The fourth switch NT5 is connected between the third node N7 and the second power supply VSS. The fourth switch NT5 may be gated in response to the output signal of the second inverter IN5 to electrically connect the third node N7 with the second power supply VSS. The buffer BF may buffer a voltage of the third node N7.

The selector 163 may output an output signal of the bypass output unit 159 or an output signal of the synchronous clock signal generator 161 in response to the lock signal LOCK or the inverted lock signal LOCKB. The selector 163 may include fifth through eighth switches NT1, P3, NT3, and P5. The fifth switch NT1 is connected between an output terminal N3 of the second inverter IV3 and an output node Y. The fifth switch NT1 may be gated in response to the inverted lock signal LOCKB to electrically connect the output terminal N3 of the second inverter IV3 with the output node Y.

The sixth switch P3 is connected between the output terminal N3 of the second inverter IV3 and the output node Y. The sixth switch P3 may be gated in response to the lock signal LOCK to electrically connect the output terminal N3 of the second inverter IV3 with the output node Y.

The seventh switch NT3 is connected between the third node N7 and the output node Y. The seventh switch NT3 may be gated in response to the lock signal LOCK to electrically connect the third node N7 and the output node Y.

The eighth switch P5 is connected between the third node N7 and the output node Y. The eighth switch P5 may be gated in response to the inverted lock signal LOCKB to electrically connect the third node N7 and the output node Y.

Referring back to FIG. 1, the clock generator 17 may generate one or more sample clock signals CLK<13:0> in response to the synchronous clock signal CKIN. The clock generator 17 may be a delay-locked loop (DLL) or a phase-locked loop (PLL). The clock generator 17 may be locked in response to a training signal included in the bypassed data signal DIN and may generate the lock signal LOCK when it is locked. Also, the clock generator 17 may generate the detection signal CKWIN for detecting the embedded clock signal EC in the delayed data signal DLLIN.

The data processor 19 may receive the data signal DIN and deserialize the serialized data D0 through D11 in the data signal DIN in response to the one or more sample clock signals CLK<13:0> generated by the clock generator 17. At this time, the data processor 19 may output a result of decoding the deserialized data based on the DC balance codes CD0 and CD1 as valid data D<13:0>. The data processor 19 may also restore and output the horizontal sync signal Hsync, the vertical sync signal Vsync, and the data enable signal DE based on the preamble signals PA1, PA3, PA5, and PA7 including at least one type of information among the information about the horizontal sync signal Hsync, the information about the vertical sync signal Vsync, and the information about the data enable signal DE.

The data processor 19 may include a deserializer 19-1 and a decoder 19-3. The deserializer 19-1 may receive the data signal DIN and deserialize the serialized data D0 through D11 included in the data signal DIN in response to the one or more sample clock signals CLK<13:0> generated by the clock generator 17. The decoder 19-3 may decode the deserialized data based on the DC balance codes CD0 and CD1 and output the valid data D<13:0> as a result of the decoding.

The display unit 21 may display an image based on the valid data D<13:0>, the horizontal sync signal Hsync, the vertical sync signal Vsync, the data enable signal DE, and the clock signal CLKout, which are output from the data processor 19.

When the data processing system 10 is implemented in a folder-type portable terminal, the number of transmission lines passing over a hinge is reduced in the portable terminal by disposing the master 11 at a lower clamshell of the portable terminal and the slave 18 and the display unit 21 at an upper clamshell thereof, thereby reducing the price and the failure rate of products.

Figure 7:
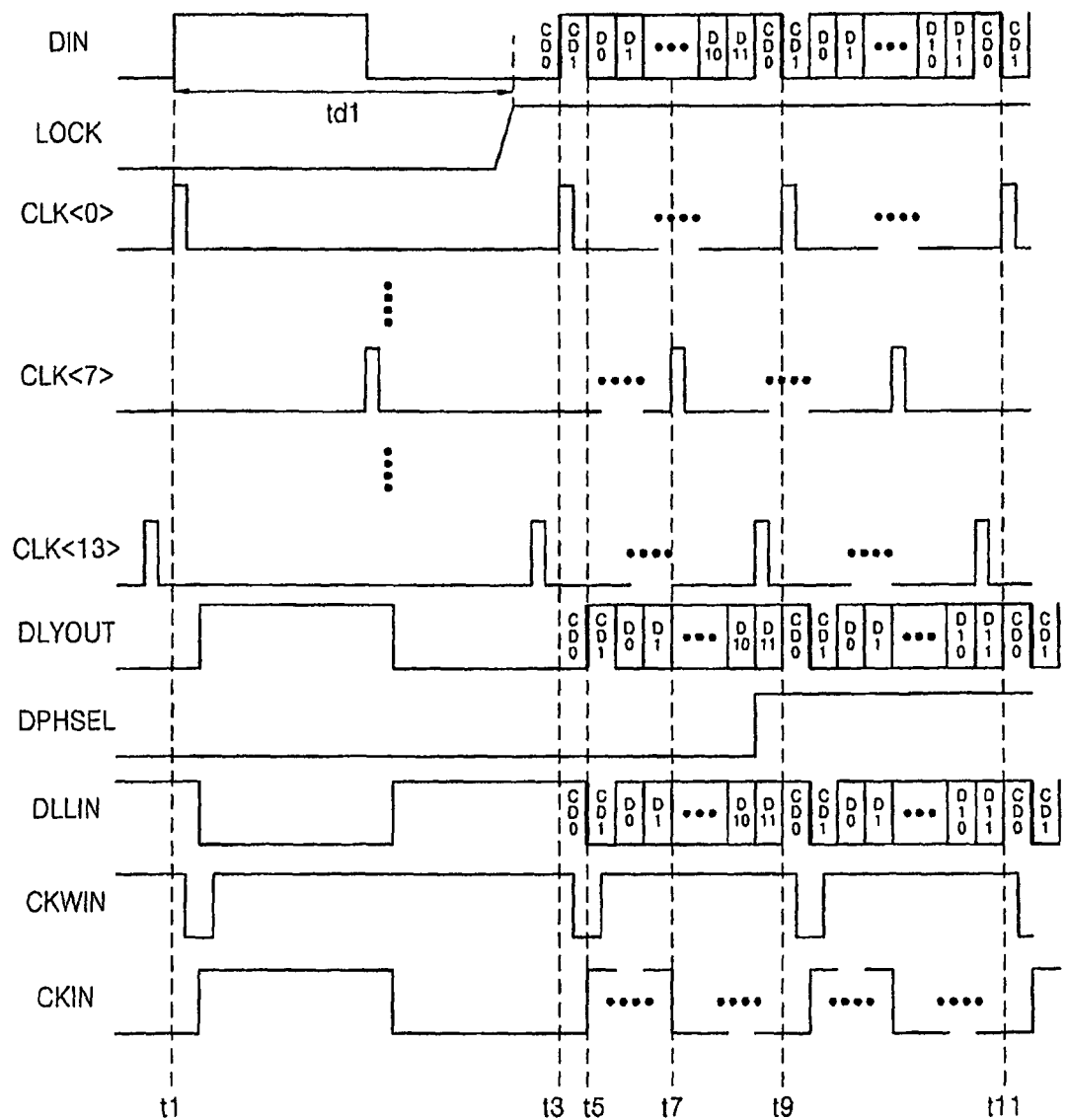
FIG. 7 is a timing chart illustrating the operation of a slave included in the data processing system illustrated in FIG. 1.

FIG. 7 is a timing chart illustrating the operation of the slave 18 included in the data processing system 10 illustrated in FIG. 1. The operation of the slave 18 will be described in detail with reference to FIGS. 1 through 7 below.

The data signal DIN input to the clock signal restoring block 15 before the clock generator 17 is initially locked, i.e., in a period "td1", includes only the preamble signal PA1, PA3, PA5, or PA7. At this time, the preamble signal PA1, PA3, PA5, or PA7 is bypassed by the clock signal restoring block 15 and input to the clock generator 17.

When the clock generator 17 is locked by the preamble signal PA1, PA3, PA5, or PA7, the clock signal restoring block 15 may detect the embedded clock signal EC in the data signal DIN and generate the synchronous clock signal CKIN that is synchronized with the serialized valid data D0 through D11 based on the embedded clock signal EC. A procedure of detecting the embedded clock signal EC in the data signal DIN after the clock generator 17 is locked will be described in detail below.

The delay signal generation unit 156 may delay the data signal DIN the predetermined period of time and output the delayed data signal DLLIN in which the DC balance codes CD0 and CD1 included in the data signal DIN transition from a first logic level (e.g., a high level of "1") to a second logic level (e.g., a low level of "0"). For instance, the flip-flop 151 may latch the data signal DIN in response to the sample clock signal CLK<13> that can detect the DC balance codes CD0 and CD1 among the one or more sample clock signals CLK<13:0>. The delay unit 153 may delay the data signal DIN by a predetermined period of time and output the delay result DLYOUT.

When one, e.g., CD0, of the DC balance codes is at the second logic level (i.e., the low level of "0"), the output signal DPHSEL of the flip-flop 151 may be at the second logic level (i.e., the low level of "0"). When the DC balance code CD0 is at the first logic level (i.e., the high level of "1"), the output signal DPHSEL of the flip-flop 151 may be at the first logic level (i.e., the high level of "1"). In other words, since the output signal DPHSEL of the flip-flop 151 is controlled prior to the DC balance codes CD0 and CD1, the DC balance codes CD0 and CD1 may make a transition from the first logic level (i.e., the high level of "1") to the second logic level (i.e., the low level of "0") without being damaged when it is applied to the synchronous clock signal generation unit 157.

Since the clock generator 17 can detect the position of the embedded clock signal EC in the data signal DIN after being locked, it may output the detection signal CKWIN for detecting the embedded clock signal EC in the delayed data signal DLLIN using at least one sample clock signal.

When the detection signal CKWIN is at a second logic level (e.g., a low level of "0") and the delayed data signal DLLIN transitions from the first logic level (i.e., the high level of "1") to the second logic level (i.e., the low level of "0"), the synchronous clock signal generation unit 157 may generate the synchronous clock signal CKIN. At this time, the synchronous clock signal generation unit 157 may use at least one sample clock signal (e.g., CLK<7> among the sample clock signals CLK<13:0> generated by the clock generator 17 and generate the synchronous clock signal CKIN which falls at a rising edge of the sample clock signal CLK<7>. The clock generator 17 may generate the one or more sample clock signals CLK<13:0> for deserializing the serialized data D0 through D11 included in the data signal DIN based on the synchronous clock signal CKIN.

Figure 8:
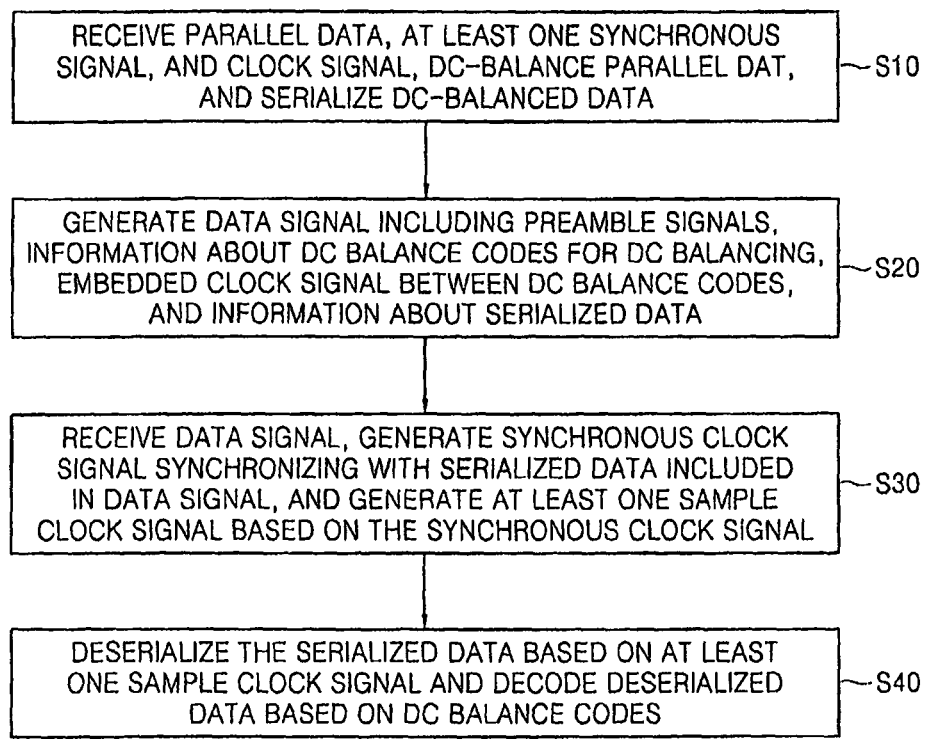
FIG. 8 is a flowchart of a data processing method according to some embodiments of the present invention.

FIG. 8 is a flowchart of a data processing method according to some embodiments of the present invention. Referring to FIGS. 1 through 3 and FIG. 8, the master 11 receives the parallel data D<13:0>, the horizontal sync signal Hsync, the vertical sync signal Vsync, the data enable signal DE, and the clock signal CLKout, DC-balances the parallel data D<13:0>, and serializes the DC-balanced data in operation S10.

The master 11 generates the data signal DIN including the preamble signals PA1, PA3, PA5, and PA7, information about the DC balance codes CD0 and CD1 for DC balancing, the embedded clock signal EC between the DC balance codes CD0 and CD1, and information about the serialized valid data D0 through D11 in operation S20.

The slave 18 receives the data signal DIN, generates the synchronous clock signal CKIN synchronized with the serialized data D0 through D11 included in the data signal DIN, and generates the one or more sample clock signals CLK<13:0> based on the synchronous clock signal CKIN in operation S30.

The slave 18 deserializes the serialized data D0 through D11 based on the one or more sample clock signals CLK<13:0>, decodes the deserialized data based on the DC balance codes CD0 and CD1, and outputs a result of the decoding as the parallel valid data D<13:0> in operation S40.

A data processing apparatus and system according to some embodiments of the present invention embed a clock signal into a data signal, thereby resolving a skew problem that may otherwise occur in a slave. In addition, the number of transmission lines for transmitting a clock signal is reduced, so that the price and the failure rate of products can be reduced.

While embodiments of the present specification have been particularly shown and described with reference to exemplary embodiments thereof, it will be understood by those of ordinary skill in the art that various changes in forms and details may be made therein without departing from the spirit and scope of the present invention as defined by the following claims.

What is claimed is:

1. A data processing apparatus, comprising:
a clock signal generation unit configured to receive a data signal comprising a preamble signal, information about DC balance codes for DC balance, an embedded clock signal between the DC balance codes, and information about serialized valid data, to generate a synchronous clock signal that is synchronized with the serialized valid data based on the data signal, and to generate at least one sample clock signal based on the synchronous clock signal;
a data processor configured to deserialize the serialized valid data based on the at least one sample clock signal, to decode deserialized data based on the DC balance codes, and to output decoded data;
wherein the clock signal generation unit comprises:
a clock signal restoring block configured to receive the data signal and to generate the synchronous clock signal synchronized with the serialized valid data based on the embedded clock signal in the data signal; and
a clock generator configured to generate the at least one sample clock signal in response to the synchronous clock signal; wherein the clock signal restoring block comprises:
a delay signal generation unit configured to delay the data signal a predetermined period of time after the clock generator is locked in response to the preamble signal comprising a training signal and to output a delayed data signal; and
a synchronous clock signal generation unit configured to detect the embedded clock signal in the delayed data signal in response to the delayed data signal and to generate the synchronous clock signal based on a result of the detection,
wherein the delay signal generation unit controls the DC balance codes comprised in the delayed data signal to transition from a first logic level to a second logic level.

2. The data processing apparatus of claim 1 wherein the preamble signal comprises a training signal and wherein the clock signal generation unit is locked in response to the training signal.

3. The data processing apparatus of claim 1, wherein the preamble signal comprises at least one type of information among information about a horizontal sync signal, information about a vertical sync signal, and information about a data enable signal and wherein the data processor restores the horizontal sync signal, the vertical sync signal, and the data enable signal based on the preamble signal.

4. The data processing apparatus of claim 3, wherein the preamble signal comprises at least one type of information among information about a blank period in the horizontal sync signal, information about a blank period in the vertical sync signal, and information about a blank period in the data enable signal and the data processor restores he horizontal sync signal, the vertical sync signal, and the data enable signal based on the information about the blank period in each of the horizontal sync signal, the vertical sync signal, and the data enable signal.

5. The data processing apparatus of claim 1, wherein the delay signal generation unit comprises:

a flip-flop configured to latch the data signal in response to one sample clock signal for detecting the DC balance codes among the at least one sample clock signal;

a delay unit configured to delay the data signal the predetermined period of time and to output a delay result; and a logic circuit configured to receive a latched signal from the flip-flop and the delay result from the delay unit, to perform an XNOR operation on the latched signal and the delayed result, and to output a result of the XNOR operation as the delayed data signal.

6. The data processing apparatus of claim 1, wherein the synchronous clock signal generation unit bypasses the data signal before the clock generator is locked and generates the synchronous clock signal after the clock generator is locked.

7. The data processing apparatus of claim 6, wherein the synchronous clock signal generation unit comprises:

a bypass output unit configured to invert the delayed data signal when the clock generator is locked;

a synchronous clock signal generator configured to detect the embedded clock signal in the delayed data signal in response to the delayed data signal and to generate the synchronous clock signal based on a result of the detection; and a selector configured to output an output signal of the bypass output unit or the synchronous clock signal in response to a lock signal indicating a lock state of the clock generator.

8. The data processing apparatus of claim 1, wherein the clock generator is a delay-locked loop (DLL) or a phase-locked loop (PLL).

9. The data processing apparatus of claim 1, wherein the data processor performs DC balancing by bypassing or inverting the serialized valid data based on levels of the respective DC balance codes.

10. The data processing apparatus of claim 1, wherein the data processor comprises:

a deserializer configured to deserialize the serialized valid data based on the at least one sample clock signal; and a decoder configured to decode the deserialized data output from the deserializer based on the DC balance codes and to output the decoded data.

11. A data processing apparatus comprising:

a clock signal generation unit configured to receive a data signal comprising a preamble signal, information about DC balance codes for DC balance, an embedded clock signal between the DC balance codes, and information about serialized valid data, to generate a synchronous clock signal that is synchronized with the serialized valid data based on the data signal, and to generate at least one sample clock signal based on the synchronous clock signal; and a data processor configured to deserialize the serialized valid data based on the at least one sample clock signal, to decode deserialized data based on the DC balance codes, and to output decoded data; wherein, when all bits of at least two valid data have a first logic level after the DC balancing is performed, the data processor recognizes that a synchronous signal starts to be input following second valid data among the two valid data, and when all bits of the at least two valid data have a second logic level since the start of the input of the synchronous signal, the data processor recognizes that the input of the synchronous signal is completed.

12. The data processing apparatus of claim 11, wherein the synchronous signal comprises at least one of a horizontal sync signal, a vertical sync signal, and a data enable signal.

* * * * *